United States Patent
Della Bona et al.

(10) Patent No.: US 7,454,839 B2
(45) Date of Patent: Nov. 25, 2008

(54) PORTABLE REFERENCE LASER UNIT AND ATTACHMENT ACCESSORY

(75) Inventors: Mark Alan Della Bona, Los Altos, CA (US); Sabrina Hofmann, Hammelburg (DE); Zhi Qing Jiang, Shenzhen (CN); Verena Kehrer, Munich (DE); Mark Kam Ming, Hong Kong (CN); Stefan Reichl, Munich (DE); Andreas Roessner, Munich (DE); Lam Yat Wah, Hong Kong (CN); Tang Chia Weng, Hong Kong (CN); Jiqiang Yang, Wuhan (CN)

(73) Assignee: Robotoolz, Ltd., Kwun Tong, Kowloon (HK)

( * ) Notice: Subject to any disclaimer, the term of this patent is extended or adjusted under 35 U.S.C. 154(b) by 67 days.

(21) Appl. No.: 11/508,549

(22) Filed: Aug. 22, 2006

(65) Prior Publication Data
US 2008/0047153 A1    Feb. 28, 2008

(51) Int. Cl.
*G01C 15/00* (2006.01)
*G01C 15/14* (2006.01)
(52) U.S. Cl. .............................. 33/283; 33/281; 33/291; 33/DIG. 21
(58) Field of Classification Search ............... 33/275 R, 33/281, 283, 285, 286, 290, 291, DIG. 21; 248/181.1, 181.2, 188.2, 188.6, 188.7, 288.31, 248/288.51; 396/428
See application file for complete search history.

(56) References Cited

U.S. PATENT DOCUMENTS

| | | | | |
|---|---|---|---|---|
| 2,194,366 A | * | 3/1940 | Ott | 248/649 |
| 2,670,228 A | * | 2/1954 | Pagliuso | 403/137 |
| 3,424,419 A | * | 1/1969 | Siegel | 248/231.71 |
| 3,614,047 A | * | 10/1971 | Hitze | 248/439 |
| 4,423,850 A | * | 1/1984 | Bass | 248/181.1 |
| 4,498,238 A | * | 2/1985 | Vaughn | 33/1 K |
| 4,650,324 A | * | 3/1987 | Underberg | 356/149 |
| 4,687,309 A | * | 8/1987 | Breslau | 396/423 |
| 4,787,613 A | * | 11/1988 | Hayes | 269/75 |
| 5,081,478 A | * | 1/1992 | Hayashida et al. | 396/425 |
| 5,567,939 A | * | 10/1996 | Hong | 250/338.1 |
| 5,572,797 A | * | 11/1996 | Chase | 33/286 |
| 5,617,762 A | * | 4/1997 | Kirsch | 74/490.06 |

(Continued)

FOREIGN PATENT DOCUMENTS

FR    2799807 A1  *  4/2001

*Primary Examiner*—R. A. Smith
(74) *Attorney, Agent, or Firm*—Greer, Burns & Crain, Ltd.

(57) ABSTRACT

A laser unit for providing at least one of a laser level line and a laser plumb line, where the unit includes both a locked mode and an unlocked (or auto-leveling) mode. In the unlocked mode, the laser unit is configured to provide at least one of a level line or a plumb line when the pendulum assembly is free to settle to a point of equilibrium. In the locked mode, a pendulum locking mechanism locks the laser assembly into a fixed position regardless of the orientation of the laser unit. Optionally, an attachment accessory may also be provided. The attachment accessory preferably includes a ball and socket joint attachment assembly that is configured for attaching the laser unit to the attachment accessory such that the laser unit can be rotated or tilted with respect to the attachment accessory.

16 Claims, 10 Drawing Sheets

U.S. PATENT DOCUMENTS

| | | | |
|---|---|---|---|
| 5,708,890 A * | 1/1998 | Nakano | 396/428 |
| 6,017,010 A * | 1/2000 | Cui | 248/288.31 |
| 6,249,983 B1 * | 6/2001 | Wright et al. | 33/286 |
| 6,352,228 B1 * | 3/2002 | Buerklin | 248/181.1 |
| 6,579,017 B2 * | 6/2003 | Wei | 396/428 |
| 6,763,595 B1 * | 7/2004 | Hersey | 33/286 |
| 6,782,034 B2 | 8/2004 | Li | |
| 7,059,057 B2 | 6/2006 | Raskin et al. | |
| 7,134,211 B2 * | 11/2006 | Bascom et al. | 33/286 |
| 7,322,707 B2 * | 1/2008 | Oross et al. | 353/119 |
| 7,392,591 B2 * | 7/2008 | Milligan et al. | 33/286 |
| 2002/0083603 A1 * | 7/2002 | Jang | 33/281 |
| 2004/0103546 A1 * | 6/2004 | Marshall et al. | 33/286 |
| 2006/0156563 A1 * | 7/2006 | Kahle | 33/290 |
| 2006/0179672 A1 | 8/2006 | Tacklind | |
| 2007/0044331 A1 * | 3/2007 | Yung et al. | 33/286 |
| 2007/0113412 A1 * | 5/2007 | Kallabis | 33/286 |
| 2007/0152116 A1 * | 7/2007 | Madsen | 248/181.1 |
| 2008/0028624 A1 * | 2/2008 | Chen | 33/286 |

* cited by examiner

PORTABLE REFERENCE LASER UNIT AND ATTACHMENT ACCESSORY

The present invention relates generally to a portable reference laser unit and also to an attachment accessory for use with the laser unit. However, as will be described below, the attachment accessory can also be used with other devices besides a laser unit, such as with cameras, laser rangefinders, or other small products with a standard tripod mount.

BACKGROUND OF THE INVENTION

Laser level units are well known in the construction and home improvement industries, and are used for producing a level plane of light to be used as a reference line for various applications. For example, the level line can be used when installing a drop ceiling, in carpentry for leveling cabinets or shelving, and when electrical conduit and junction boxes are being installed. The addition of a laser plumb line to the laser level line is also known. Uses of such a combination of the level and plumb lines, which create a cross-line, include aligning tiles on both floors and walls and creating cutouts for doors and windows during construction. The laser assemblies that create such level and plumb lines are normally mounted upon a mounting structure that includes a pendulum so that the level and plumb positions are automatically arrived at when the pendulum reaches equilibrium.

BRIEF SUMMARY OF THE INVENTION

Briefly, one embodiment of the present invention provides a laser level unit that can create either a level line or a plumb line, or both, and that includes a structure for disabling the auto-leveling feature and locking the laser assemblies in a fixed position. Thus, for example, the level and/or plumb laser lines can be projected against a surface at any desired angle. The locked mode could be used, for example, to create reference lines for painting designs upon a wall (such as one or more stripes set at a predetermined angle), or for hanging multiple pictures in a certain configuration.

More specifically, one example of the present invention relates to a laser unit for providing at least one of a laser level line and a laser plumb line. The laser unit preferably includes a housing, a pendulum assembly located within the housing, and a laser assembly for providing either a level line or a plumb line. The laser assembly is preferably mounted upon the pendulum assembly such that the laser unit is configured to provide at least one of a level line or a plumb line when the pendulum assembly is in a unlocked mode. There is also preferably a pendulum locking mechanism for locking the laser assembly into a locked mode in which the laser assembly is locked into a fixed position regardless of the orientation of the laser unit.

Another feature of an embodiment of the present invention is an attachment accessory for use with a laser unit, or other device including a standard tripod mount. The attachment accessory preferably provides a mechanism for both tilting and swiveling the device mounted thereon, and also provides multiple ways of being attached to different structures, such as pipes, walls, studs, etc. In a preferred embodiment, the attachment accessory is compact, yet still provides stability when seated on a horizontal surface through the use of a set of fold-away stabilizing legs.

More specifically, one example of the present attachment accessory includes a main body and a ball and socket joint attachment assembly attached to the main body. The ball and socket joint attachment assembly is configured for attaching a laser unit, or other device, to the attachment accessory such that the device can be rotated or tilted with respect to the attachment accessory. Optionally, the attachment accessory may include a pair of stabilizing legs configured and arranged to swing out from the main body of the accessory.

BRIEF DESCRIPTION OF THE DRAWINGS

Preferred embodiments of the present invention are described herein with reference to the drawings wherein.

DETAILED DESCRIPTION OF THE INVENTION

Figure 1:
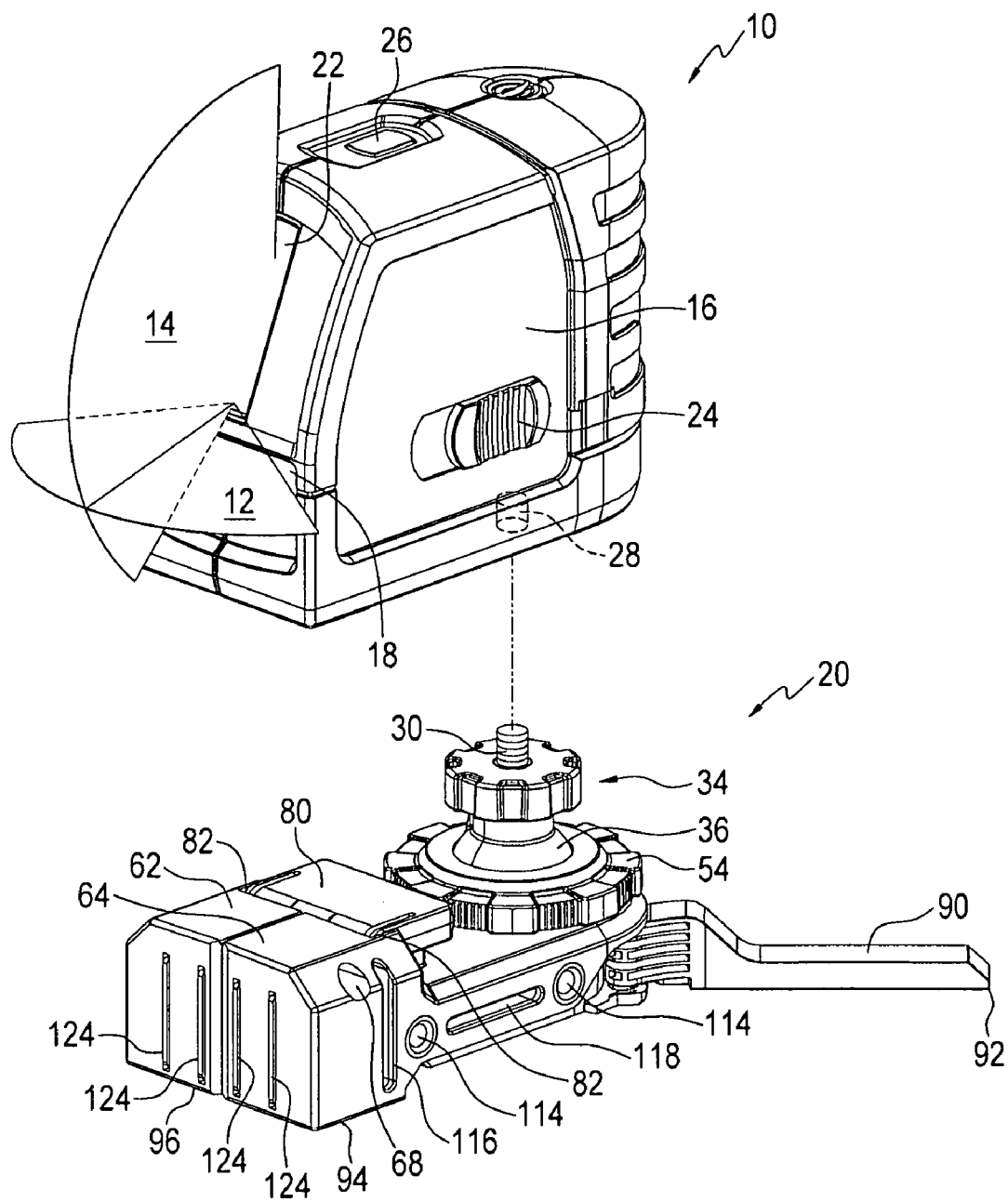
FIG. 1 is a view of a laser unit shown prior to being attached to an attachment accessory.

Turning now to the figures, one example of the present laser unit and attachment accessory is shown in FIGS. 1-13. Specifically, FIG. 1 shows one example of a laser unit 10 that is configured to be mounted upon an attachment accessory 20. The laser unit 10 includes one or more laser assemblies, each configured for creating a laser reference line. For example, the laser unit 10 may include a first laser assembly for making a level line, represented by light fan 12, and/or a second laser assembly for making a plumb line, represented by light fan 14. In the preferred embodiment, the level line laser assembly provides a laser level line 12 with a fan angle of approximately 120°, and the plumb line laser assembly provides a laser plumb line 14 with a fan angle of approximately 140°. However, other fan angles are also contemplated as being within the scope of the invention.

The laser assembly/assemblies is/are contained within a housing 16 that includes, depending on the application, a horizontal beam aperture 18 for the level laser line and/or a vertical beam aperture 22 for the plumb laser line. The housing 16 may be configured as two or more separate sections (such as sections 16A and 16B of FIG. 8) that are joined together in any known manner. The housing 16 preferably includes one or more switches, such as switch 24, which is used to turn the laser(s) on and off, and to place the laser assembly in a locked mode (which is described more fully below), and switch 26, which is a line options button for selecting between the following options: the level line only, the plumb line only, and both the level line and the plumb line (to create a cross line). Of course, line options switch 26 would only apply to embodiments that include both the level line laser assembly and the plumb line laser assembly.

Figure 8:
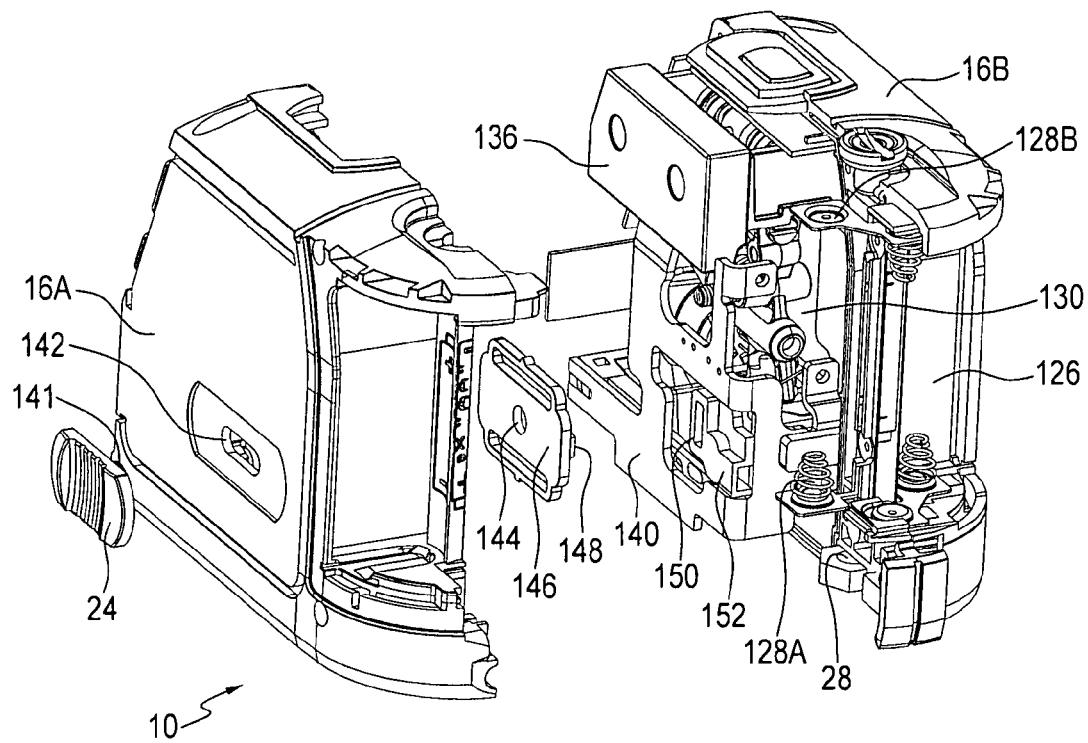
FIG. 8 is an exploded view of the laser unit.

On the bottom of housing 16, there is preferably structure for mounting the laser unit 10 to the attachment accessory 20, such as a threaded hole 28 (shown in phantom in FIG. 1, and also shown in FIG. 8). The threaded hole 28 is preferably also configured for mounting the laser unit 10 to a tripod (not shown), and may be, for example, a ¼"×20 tripod mount.

The attachment accessory 20 preferably includes structure, such as a shaft with a threaded portion 30, that is configured to mate with threaded hole 28 (or other similar structure) of the laser unit 10. Thus, for example if the threaded hole 28 is a ¼"×20 tripod mount (female), then the threaded shaft would be a ¼"×20 tripod mount (male). Of course other sizes are also contemplated as being within the scope of the invention. Additionally, since the threaded portion 30 of the attachment accessory 20 is preferably a standard size tripod mount, the attachment accessory can also be used with other devices besides the laser unit, such as digital cameras, laser rangefinders, etc. The attachment accessory can also be used with other types of laser units, such as a unit that generates one or more beams, which create a reference point (as opposed to a line), such as used for establishing centerlines in preparation for drilling a plurality of successively aligned holes, which are inclined at an angle.

Figure 2:
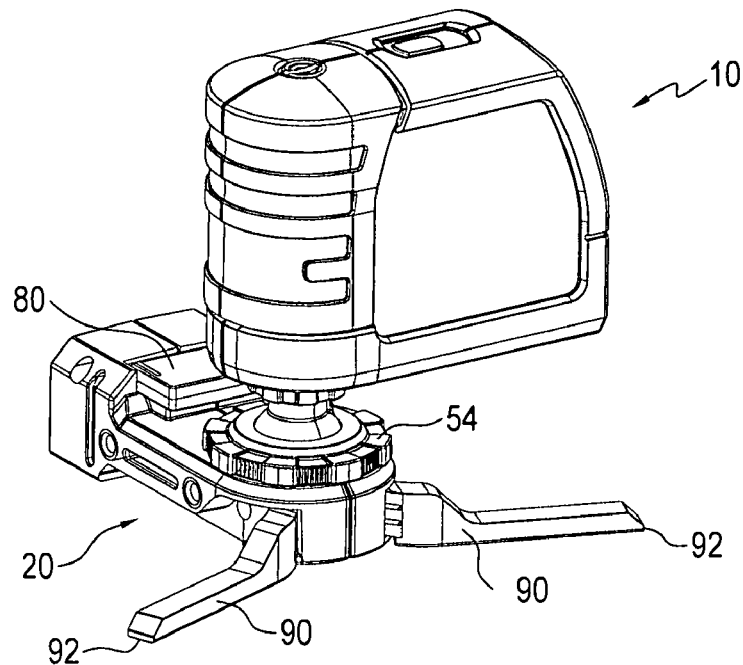
FIG. 2 is a view of a laser unit attached to the attachment accessory, with the unit being swiveled by approximately 90°.
Figure 3:
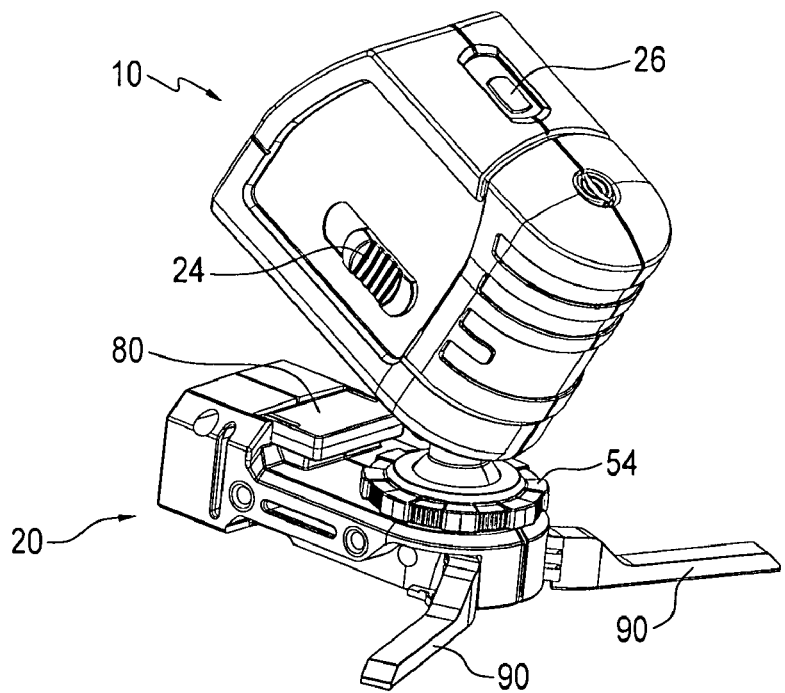
FIG. 3 is a view of a laser unit attached to the attachment accessory, with the unit being tilted by approximately 45°.

The threaded portion 30 is connected, via shaft 31, to a ball portion 32 (shown in the cross-section view of FIG. 7) of a ball and socket joint 34, which also includes socket 36. Thus, shaft 31 includes a threaded portion 30 on one end and a ball portion 32 on the other end. The upper portion, or collar 40, of socket 36 includes a slotted portion 38 (FIG. 4), both of which enable the threaded shaft 30 to be tilted with respect to the socket 36 and the attachment accessory 20. The collar 40 permits the shaft 31 to be tilted to a first angle (such as 15°), while the slotted portion 38 permits shaft 31 to be tilted to a second angle (such as 45°), which second angle is greater than the first angle. Thus, when the laser unit 10 is mounted to the attachment accessory 20, the ball and socket joint 34 allows the attachment accessory to be swiveled to any desired position (around a full 360°), and to be tilted by, for example, up to 45°. For example, FIG. 2 shows laser unit 10 attached to attachment accessory 20 in an upright position (i.e., with no tilting), but swiveled 90° in the clockwise direction; and FIG. 3 shows the laser unit attached without any swivel angle, but tilted by approximately 45°. Although a full 360° swivel angle and a 45° maximum tilt angle have been described, it is also contemplated that a stop could be included to prevent a full 360° swivel, and that a maximum tilt angle of either greater than or less than 45° could also be utilized. Additionally, the collar need not limit the tilting to 15° in areas other than the slotted portion, but can instead limit tilting to angles greater or less than 15°.

Figure 7:
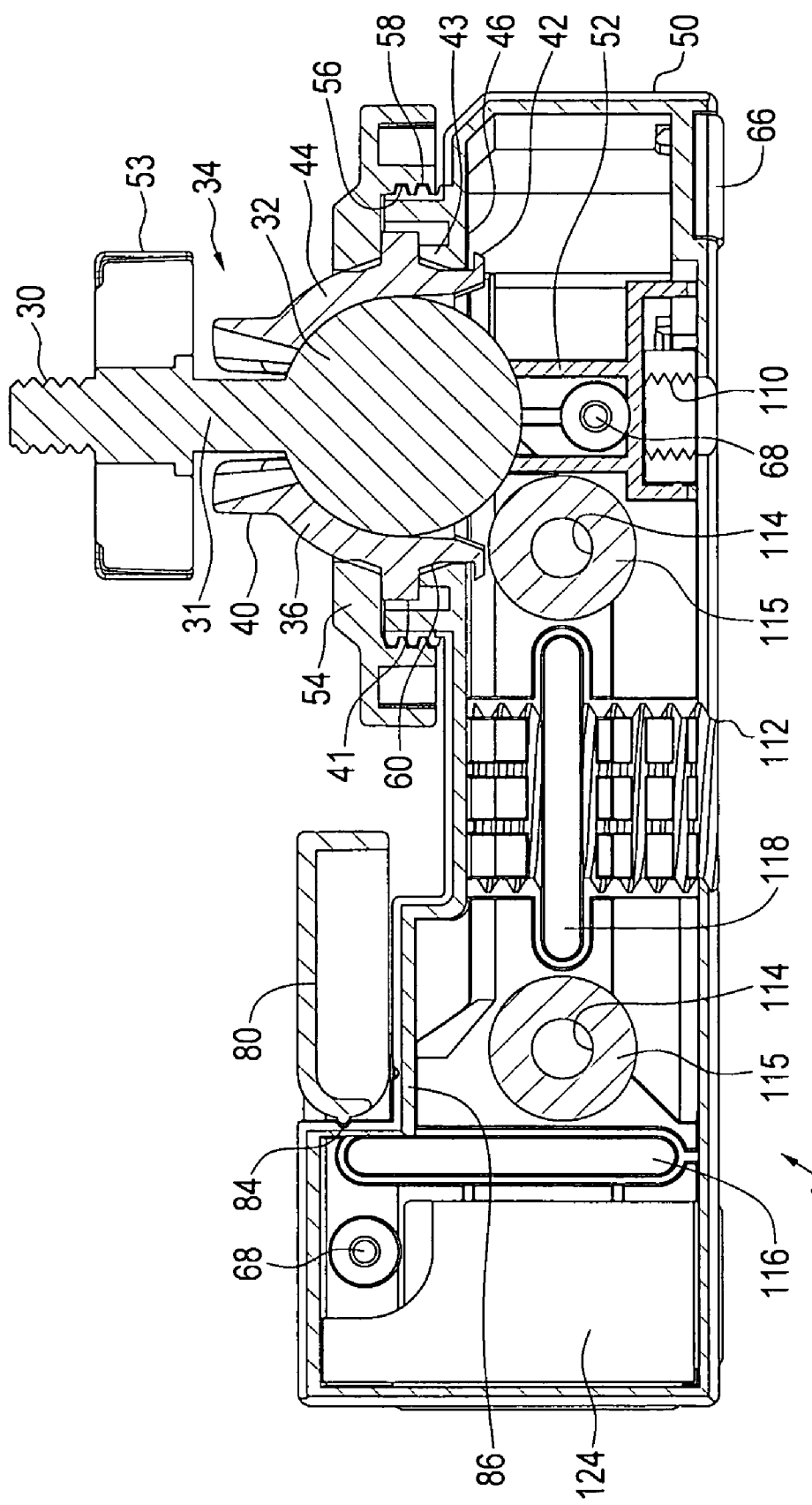
FIG. 7 is a cross-sectional view of the attachment accessory.

The components of the ball and socket joint 34 can be seen in FIG. 7, which is a cross-section of attachment accessory 20. As mentioned earlier, ball and socket joint 34 includes shaft 31 that has one end attached to threaded portion 30 and another end attached to ball portion 32, which is seated within socket 36. The upper portion of the socket 36 defines a collar 40, and the lower portion of the socket defines a lower flange portion 42. Between the collar 40 and the lower flange portion 42 there is preferably an upper flange portion 41. Upper flange portion 41, which is preferably annular, but may also include one or more notches, sits upon annular shoulder 43, which is formed on an outer top surface of attachment accessory 20. The lower flange portion 42 contacts an upper inner surface 46 of the attachment accessory housing 50. The combination of the annular shoulder 43, acting upwardly against the upper flange portion 41, and the upper inner surface 46, acting downwardly against the lower flange 42, keep the socket 36 from separating from the attachment accessory 20.

Figure 4:
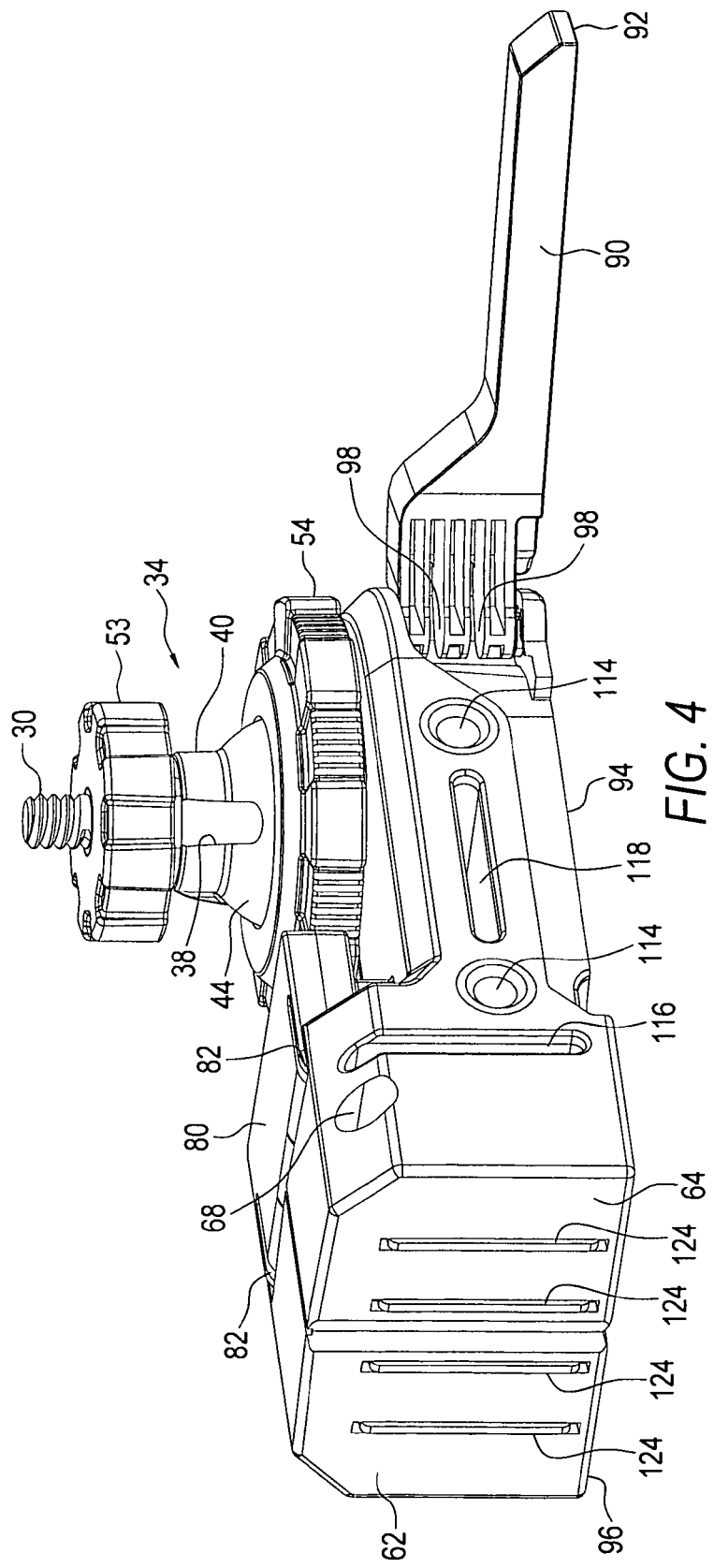
FIG. 4 is a detailed side and rear perspective view of the attachment accessory.

The interior of the attachment accessory also includes a seating portion 52, upon which the ball portion 32 is seated, but is still free to swivel and tilt. The seating portion 52 is preferably in the form of an open cylinder, with its upper surface chamfered to receive ball portion 32. As shown in FIG. 4, the slot 38, which allows the threaded shaft to be tilted, preferably extends from collar 40 into a mid-portion 44 of the socket 36. When the threaded shaft 30 has been swiveled and rotated to the desired position, which movement is facilitated by the use of grip member 53, the position can be secured by tightening a tilt/swivel locking ring 54, which, as shown in FIG. 7, has internal threads 56 that mate with external threads 58 that surround aperture 60 within which socket 44 is positioned. Both the grip member 53 and the tilt/swivel locking ring 54 may have outer circumferences that are be patterned, such as with the axially extending channels shown in FIGS. 1, 4 and 5, to provide the user with a better gripping surface.

As with the housing 16 of the laser unit 10, housing 50 for the attachment accessory 20 is preferably made of multiple sections that are attached together to form the main body of the attachment accessory. For example, the housing 50 may be comprised of two primary sections 62 and 64, best shown in FIG. 6, which are connected together by screws 68 (FIG. 7), and a bridging section 66. Of course, the housing 50 may also be made from more or fewer than the number of parts in the embodiment described, and other means of fastening the components together may also be utilized.

Turning now to FIGS. 1 and 4-7, details of various optional features of the attachment accessory 20 will be described. One optional feature is the horizontal rest or reference plate 80, which is shown in FIG. 4 in a rest position and in FIG. 5 in an upright, or supporting, position. In the rest position of FIG. 4, the reference plate 80 extends generally horizontally, and is generally flush with an upper surface of the attachment accessory 20. When it is desired to use reference plate 80 to provide additional support for the front portion of the laser unit 20, and to align the laser unit 20 to be parallel with the base of the attachment accessory 20, the reference plate 80 is pivoted into the supporting position of FIG. 5 in which the plate extends generally vertically.

The reference plate 80 is preferably attached to the accessory 20 via two pivot points 82 (FIGS. 1 and 4) in which the plate includes two projections and the accessory includes one aperture for receiving each of the projections. To provide secure locking of the reference plate 80 in either of the two positions (the rest position and the supporting position), tabs 84 and 86 (FIG. 7) may be provided on reference plate 80, which tabs 84 and 86 are configured to mate with corresponding channels provided on the accessory 20. In addition to providing secure locking into either of the two positions, the tab/channel configuration also provides an audible "click," which alerts the user that the reference plate is securely locked into the desired position.

Figure 5:
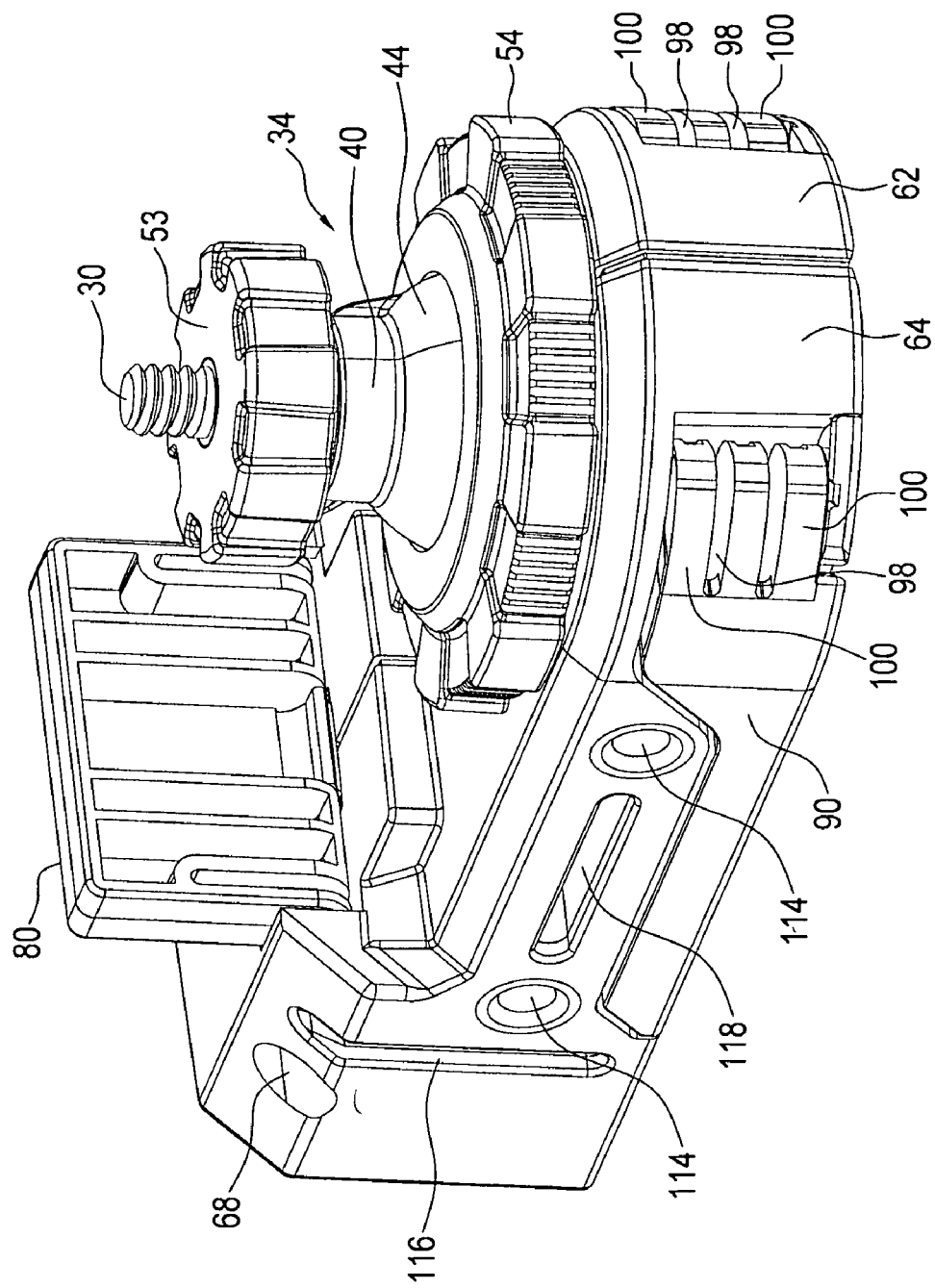
FIG. 5 is a detailed side and front perspective view of the attachment accessory, shown with the horizontal rest in an upright position and with the stabilizing legs folded inwardly.
Figure 6:
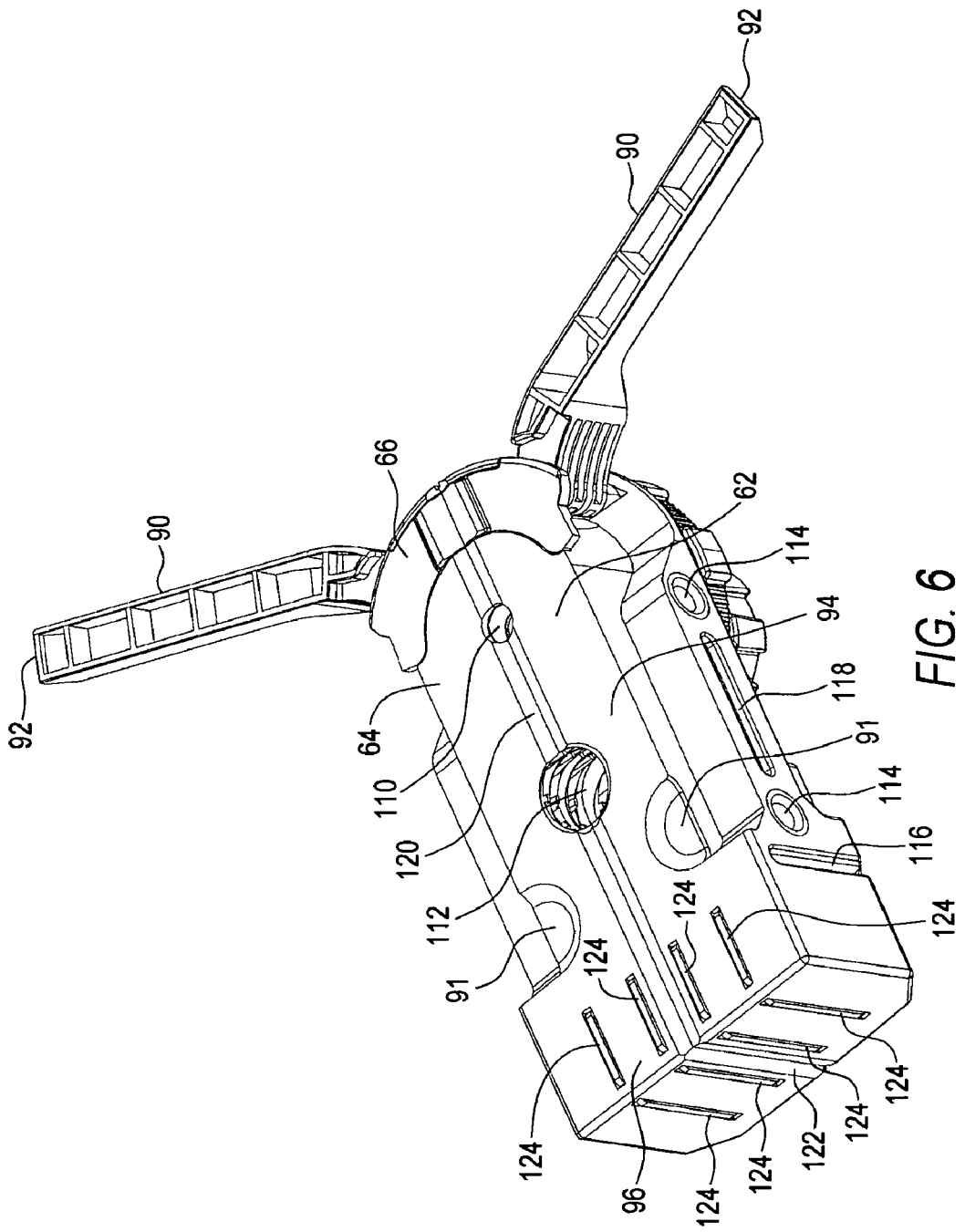
FIG. 6 is a bottom perspective view of the attachment accessory, with the stabilizing legs folded outwardly.

In order to better stabilize the accessory 20 and laser unit 10 combination upon a horizontal surface, a pair of stabilizing legs 90 (FIGS. 1, 4, 5 and 6) may also be provided. FIG. 5 shows how the legs 90 can be folded away into a closed position, which reduces the footprint of the accessory 20 for storage or transport, and FIGS. 1, 4 and 6 show legs 90 folded outwardly in the stabilizing position. Thumb/finger recesses 91 (FIG. 6) may optionally be provided to facilitate moving the legs from the closed position.

Legs 90 are preferably pivotally attached to the main body of the attachment accessory in such a manner so that when the stabilizing legs 90 are pivoted outwards from the main body into an open position, the stabilizing legs each swivel slightly downwards such that a bottom end surface 92 of each of the stabilizing legs 90 is slightly offset from a bottom surface 94 of the main body of the attachment device 20. The offset is created by having the pivot axis inclined slightly outwardly, with its upper portion pointing away from the main body. Such a configuration permits the accessory 20 to be essentially supported via three points (both end surfaces 92 and accessory edge 96). Voids 98 may be provided near pivot connection arms 100 (FIG. 5) to provide a space for arms 100 to be deformed into so that arms 100 resiliently connect stabilizing legs to the accessory at the pivot points.

Other optional features of the present attachment accessory include various means for securing the device to a variety of other devices or surfaces. For example, as shown in the bottom view of FIG. 6, the attachment accessory 20 may include threaded holes such as holes 110 and 112 for attaching the accessory to a tripod such as a surveyor's tripod (with a ⅝"×11 tripod mount) or a camera tripod (with a ¼"×20 tripod mount). The attachment accessory 20 may also include two or more through holes, such as through holes 114 of FIGS. 1, 4, 5, 6, and 7, which can be used to screw or nail the attachment accessory 10 and the attached laser unit to a wall or other generally vertical surface. In order to strengthen through holes 114, fittings 115 (FIG. 7) of brass, or other metal, may be inserted into each through hole.

In order to affix the attachment accessory 20 and laser unit 10 to a pipe or a stud, the attachment accessory optionally includes one or more strap raceways, such as vertical strap raceway 116 and horizontal strap raceway 118. To use either of these raceways, a strap is fed through the raceway, and the strap is then wrapped around and secured about a pole, pipe, bar or stud. In order to provide better alignment when affixed to a round member, the attachment accessory 20 is optionally provided with alignment channels, such as alignment channels 120 and 122 of FIG. 6.

For affixing the attachment accessory 20 and laser unit 10 to an object such as a steel stud, the accessory 20 may optionally include one or more magnets, such as magnets 124, which are shown in FIGS. 1, 4 and 6. Magnets 124 preferably extend to the exterior of the attachment accessory housing 50, or if not, are at least strong enough to create a magnetic field near at least one exterior surface of the housing 50, with the magnetic field being strong enough to affix the attachment accessory to an object containing magnetic material.

Figure 9:
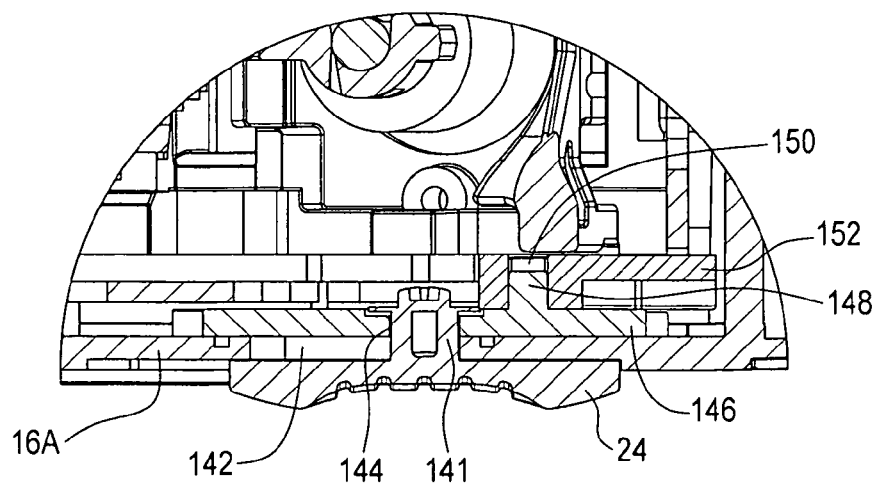
FIG. 9 is a detailed cross-section of the on/off/lock switch of the laser unit.
Figure 10:
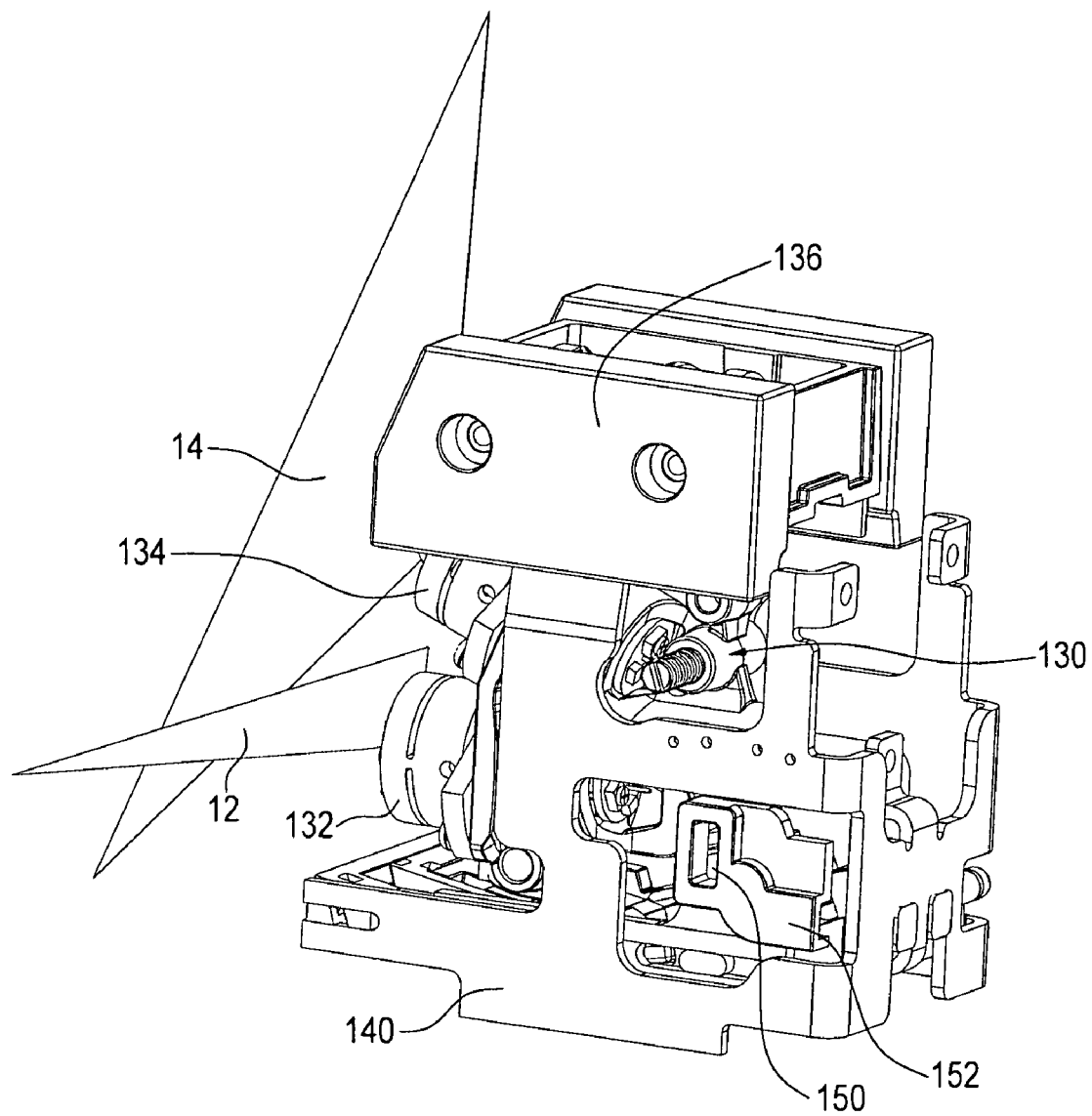
FIG. 10 is a view of the pendulum assembly.
Figure 11:
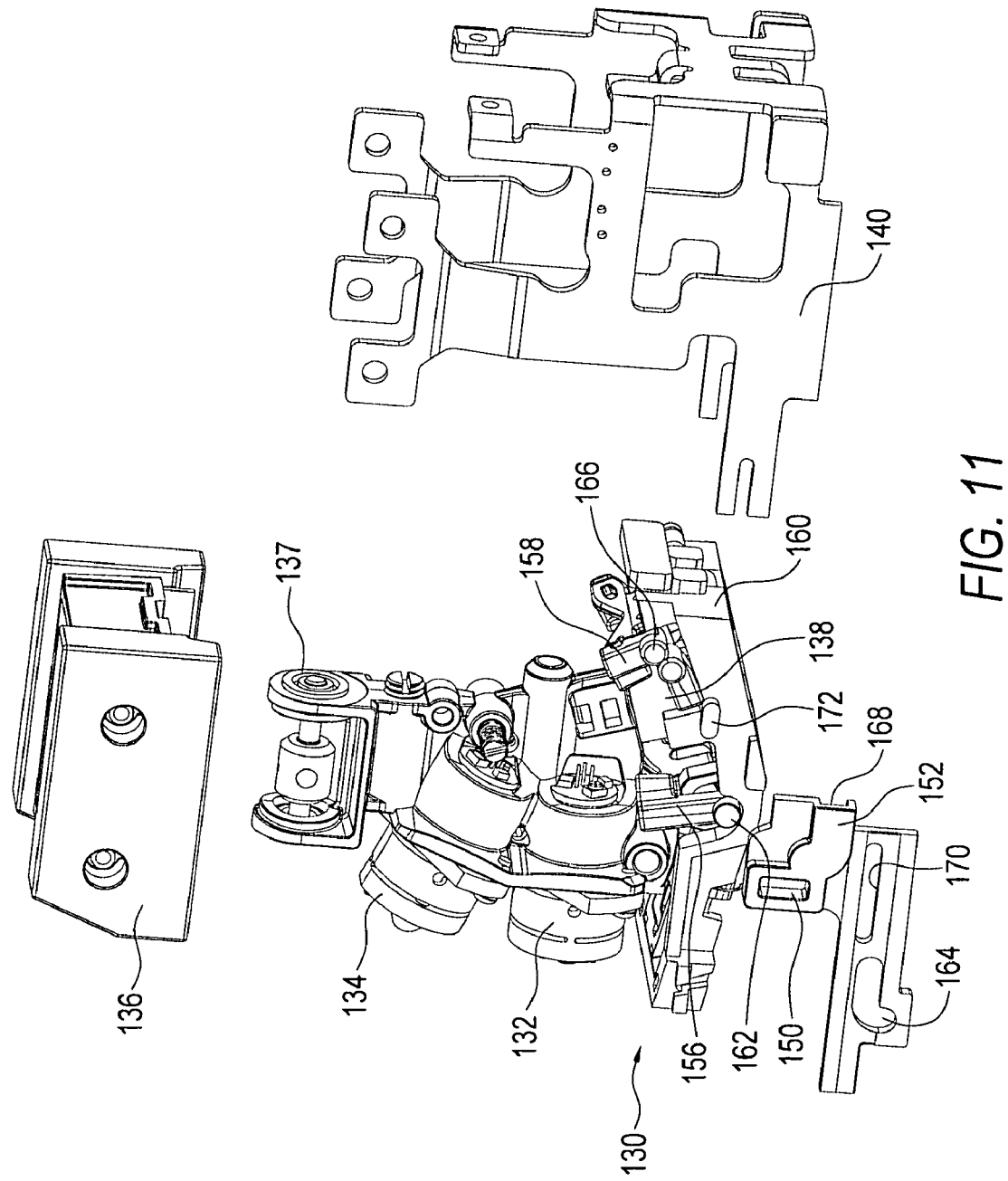
FIG. 11 is an exploded view of the pendulum assembly.

Turning now to FIGS. 8-13, some of the features of the laser unit 10 will be described. FIG. 8 is an exploded rear view of the laser unit 10, showing sections 16A and 16B of the housing unit 16 separated from each other. As known in the art, the laser unit is powered by a battery assembly, or other portable power unit, that can be seated within power compartment 126, which includes one or more sets of contacts, such as contacts 128A and 128B. As shown in FIG. 11, in this embodiment, there is a pendulum assembly 130 which supports a level line laser assembly 132 and a plumb line laser assembly 134. FIGS. 1 and 10 show how the level line laser assembly 132 creates a light fan 12 for the level reference line and the plumb line laser assembly 134 creates a light fan 14 for the plumb reference line. Unless it is in a locked position, as described below, the pendulum assembly 130 uses the force of gravity to position the laser assemblies so that a true level reference line in the horizontal direction and a true plumb line in the vertical direction (perpendicular to the level line) are created. More specifically, as shown in the exploded view of FIG. 11, the pendulum assembly 130 is allowed to pivot within pendulum bearing support assembly 136, via a connection with pendulum bearing 137, until the pendulum bob 138 reaches equilibrium. The entire pendulum assembly 130 is supported and protected by being positioned within support frame 140.

One of the optional features of the present invention is that the laser assemblies may be locked in position so that the laser line (or lines) is maintained in a single position with respect to the laser unit 10, regardless of how the laser unit is tilted or swiveled. In other words, when in the locked position, the level and plumb lines will not automatically become level or plumb because the pendulum assembly 130 is prevented from swinging to equilibrium. Such a position allows for the creation of lines other than level or plumb lines, such as at 45° angles, or any other angle, which can be projected against a wall or other surface. These lines could be useful, for example, when painting certain designs upon a wall, such as stripes aligned at a 45° angle, or when hanging pictures in a certain configuration. Of course, many other uses are also contemplated as being within the scope of the invention.

One example of a mechanism for locking the pendulum unit will now be described while referring to FIGS. 8-13. As best seen in FIGS. 8 and 9, the on/off/lock switch 24 includes a tab 141 that extends through an elongated slot 142 in housing section 16A. The tab 141 is configured to mate with aperture 144 of switch adapter 146. The switch adapter 146 includes a projection 148 that is configured to mate with vertical groove 150 of pendulum lock drive arm 152.

Turning now to FIG. 11, the manner in which the pendulum lock drive arm 152 interacts with front and rear locks that lock the pendulum bob 138 will be described. A front pendulum lock 156 and a rear pendulum lock 158 are supported within a locking support frame 160. The front pendulum lock 156 is driven via a connection between pin 162 and L-shaped slot 164, and the rear pendulum lock 158 is driven via a connection between pin 166 and L-shaped slot 168. Linear movement of the pendulum lock drive arm 152 is maintained via the interaction between elongated slot 170 and elongated projection 172.

Figure 12B:
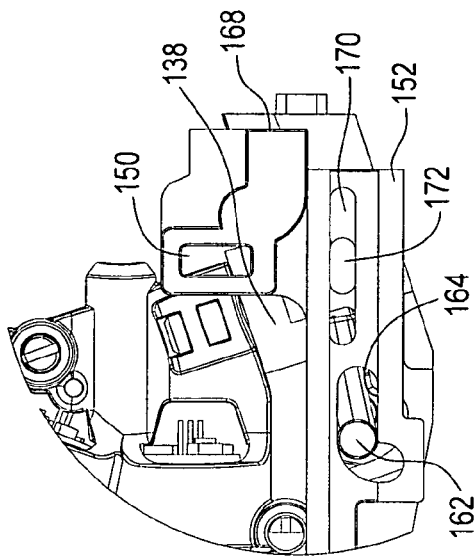
FIG. 12B is a side view of the pendulum locking mechanism, shown in the locked position.
Figure 13B:
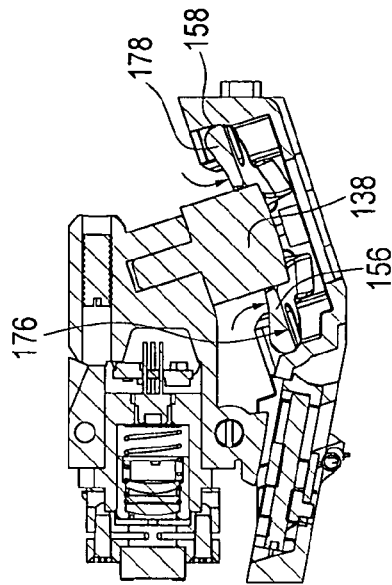
FIG. 13B is a cross-sectional view of the pendulum locking mechanism, shown in the locked position.
Figure 12A:
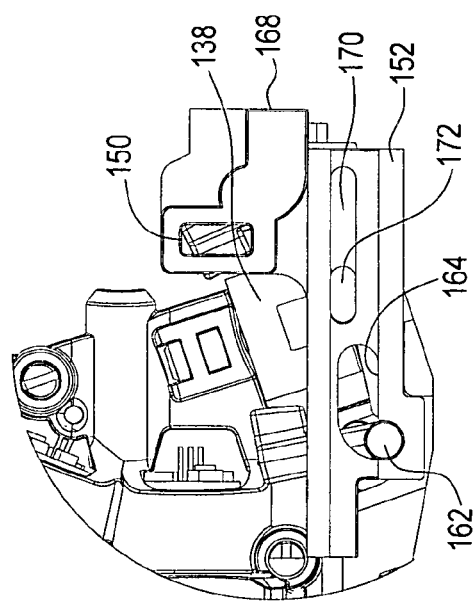
FIG. 12A is a side view of the pendulum locking mechanism, shown in the unlocked position.
Figure 13A:
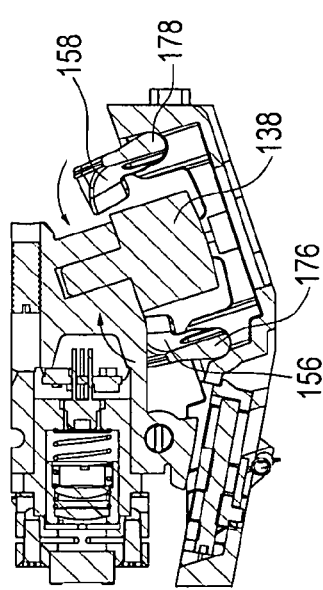
FIG. 13A is a cross-sectional view of the pendulum locking mechanism, shown in the unlocked position.

FIGS. 12A and 12B are side views of a portion of the pendulum lock assembly, where FIG. 12A is in the unlocked position and FIG. 12B is in the locked position, and FIGS. 13A and 13B are side cross-sectional views, where FIG. 13A is in the unlocked position and FIG. 13B is in the locked position. In the unlocked position of FIGS. 12A and 13A, pendulum lock drive arm 152 is shifted to the right so that front pendulum lock pin 162 is positioned towards the bottom left portion of L-shaped slot 164. Although not shown in FIGS. 12A and 13A, the rear pendulum lock pin 166 (of FIG. 11) is positioned within the top left portion of L-shaped slot 168. As can be seen in FIG. 13A, in the unlocked position, front pendulum lock 156 and rear pendulum lock 158 do not make contact with pendulum bob 138, and accordingly, the pendulum assembly 130 is free to swivel to a point of equilibrium.

In order to lock the pendulum assembly 130, which is the position shown in FIGS. 12B and 13B, pendulum lock drive arm 152 is moved to the left, which causes front pendulum lock pin 162 to travel upwards, as can be seen when comparing the locked position of FIG. 12B with the unlocked position of FIG. 12A. In a similar manner, although not shown, rear pendulum lock pin 166 travels downwards within L-shaped slot 168.

With the movement of front pendulum lock pin 162 upwards (as shown in FIG. 12B), front pendulum lock 156 pivots clockwise about pivot point 176, against a spring biasing force (not shown), because front pendulum lock pin 162 is attached to the front pendulum lock 156 at a point that is offset and to the left (in the view of FIGS. 12A and 13A) of pivot point 176. Thus, front pendulum lock 156 is now contacting, and partially surrounding, pendulum bob 138, as shown in FIG. 13B. Similarly, with the movement of rear pendulum lock pin 166 (FIG. 11), attached rear pendulum lock 158 pivots, against a spring biasing force, about pivot point 178 so that it is also contacting, and partially surrounding, pendulum bob 138, as also shown in FIG. 13B. Accordingly, the pendulum bob 138 is now locked, and thus the laser assemblies 132 and 134 are locked in a stationary position, and will not seek equilibrium to automatically define a level line and a plumb line. When it is desired to unlock the laser assemblies, so that the laser unit 10 can automatically level and plumb, on/off/lock switch 24 is moved to the right, so that the pendulum lock drive arm is in the position of FIG. 12A, which unlocks pendulum locks 156 and 158 to the positions of FIG. 13A. On/off/lock switch 24 is also preferably used to turn the laser assemblies 132 and 134 on and off, however, since such operations are known in the art, the on/off mechanism will not be described here.

While various embodiments and features of the present invention have been shown and described, it should be understood that other modifications, substitutions and alternatives may be apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A laser unit for providing at least one of a laser level line and a laser plumb line, the laser unit comprising:
   a housing;
   a pendulum assembly located within said housing;
   a laser assembly for providing either a level line or a plumb line, said laser assembly being mounted upon said pendulum assembly such that said laser unit is configured to provide at least one of a level line or a plumb line when said pendulum assembly is in a unlocked mode; and
   a pendulum locking mechanism for locking said laser assembly into a locked mode in which said laser assembly is locked into a fixed position regardless of the orientation of said laser unit;
   wherein said pendulum assembly includes:
   a pendulum bearing that is pivotably attached to a pendulum bearing support assembly; and
   a pendulum bob mounted below said pendulum bearing;
   wherein said pendulum locking mechanism includes:
   a pendulum lock drive arm that includes a pair of L-shaped slots; and
   a pair of pivotable pendulum locks that each include a pin configured to mate with one of said L-shaped slots.

2. The laser unit as defined in claim 1, further comprising a second laser assembly, wherein one of said laser assemblies provides a level line and the other of said laser assemblies provided a plumb line, and further wherein said pendulum locking mechanism locks both of said laser assemblies in a fixed position.

3. The laser unit as defined in claim 2, wherein said level line laser assembly provides a laser line with a fan angle of approximately 120°; and said plumb line laser assembly provided a laser line with a fan angle of approximately 140°.

4. An attachment accessory for a laser unit, the attachment accessory comprising:
   a main body; and
   a ball and socket joint attachment assembly attached to said main body, said ball and socket joint attachment assembly configured for attaching a laser unit to said attachment accessory such that the laser unit can be rotated or tilted with respect to said attachment accessory;
   a pair of stabilizing legs configured and arranged to swing out from said main body; and
   wherein each of said stabilizing legs is pivotably attached to said main body, and further wherein when said stabilizing legs are pivoted outwards from said main body from a closed position, in which a bottom end surface of each of said stabilizing legs is approximately flush with a bottom surface of said main body, into an open position, said stabilizing legs each swivel slightly downwards such that the bottom end surface of each of said stabilizing legs is slightly separated from a plane coincident with the bottom surface of said main body.

5. The attachment accessory according to claim 4, wherein said ball and socket joint attachment assembly includes:
   a shaft that includes a threaded portion on a first end and a ball portion on a second end; and
   a socket for receiving said ball portion, wherein said ball portion and said socket are configured and arranged to permit both 360° rotation of said ball portion within said socket and tilting of said shaft with respect to said main body of up to approximately 45°.

6. The attachment accessory as defined in claim 4, wherein said ball and socket joint attachment assembly includes:
   a shaft that includes a threaded portion on a first end and a ball portion on a second end; and
   a socket for receiving said ball portion, wherein said socket includes a collar that permits said shaft to be tilted to a first angle and further wherein said collar includes a slotted portion that permits said shaft to be tilted to a second angle, where said second angle is greater than said first angle.

7. The attachment accessory as defined in claim 4, wherein said ball and socket joint attachment assembly includes:
   a shaft that includes a threaded portion on a first end and a ball portion on a second end; and
   a socket for receiving said ball portion, wherein said socket includes a locking ring for locking said ball and socket joint attachment assembly into a fixed position with respect to said main body.

8. The attachment accessory as defined in claim 7, wherein:
   said locking ring includes an internally threaded portion; and
   said main body includes an externally threaded portion configured and arranged to mate with said internally threaded portion of said locking ring.

9. The attachment accessory as defined in claim 4, wherein said main body includes at least one internally threaded tripod mounting aperture for receiving an externally threaded tripod shaft.

10. The attachment accessory as defined in claim 4, wherein said main body further comprises:
    at least one strap raceway that extends completely through said main body; and
    at least one channel that extends along an outer surface of said main body for facilitating alignment of said attachment accessory with respect to a cylindrical object.

11. The attachment accessory as defined in claim 4, further comprising at least one magnet that creates a magnetic field near at least one outer surface of said main body, wherein said at least one magnetic is configured and arranged for affixing the attachment accessory to an object containing a magnetic material.

12. The attachment accessory as defined in claim 4, further comprising a reference plate pivotably attached to said main body, wherein said reference plate is configured and arranged to be pivoted between a rest position in which said reference plate extends generally horizontally and a supporting position in which said reference plate extends generally vertically.

13. The attachment accessory as defined in claim 4, wherein said stabilizing legs are each pivotably attached to said main body via a pivot axis that is inclined slightly outwardly, with respect to a vertical line, and further wherein the bottom surface of the main body extends horizontally.

14. A system for providing a laser line on a surface, the system comprising:
- a laser unit for providing at least one of a laser level line and a laser plumb line; and
- an attachment accessory for said laser unit, wherein said attachment accessory includes:
  - a main body; and
  - a ball and socket joint attachment assembly attached to said main body, said ball and socket joint attachment assembly configured for attaching said laser unit to said attachment accessory such that said laser unit can be rotated or tilted with respect to said attachment accessory,
  - wherein a socket of said ball and socket joint attachment assembly includes an upper flange portion and a lower flange portion, and further wherein said main body includes an annular shoulder which acts upwardly against said upper flange portion, and an upper inner surface, which acts downwardly against said lower flange, such that said socket is maintained in association with said main body.

15. The system as defined in claim 14, wherein said laser unit includes:
- a housing;
- a pendulum assembly located within said housing;
- a laser assembly for providing either a level line or a plumb line, said laser assembly being mounted upon said pendulum assembly such that said laser unit is configured to provide at least one of a level line or a plumb line when said pendulum assembly is in a unlocked mode; and
- a pendulum locking mechanism for locking said laser assembly into a locked mode in which said laser assembly is locked into a fixed position regardless of the orientation of said laser unit.

16. The system as defined in claim 14, wherein said attachment accessory further includes:
- a pair of stabilizing legs configured and arranged to swing out from said main body, wherein each of said stabilizing legs is pivotably attached to said main body via a pivot axis that is inclined slightly outwardly, with respect to a vertical line, whereby a bottom end surface of each of said stabilizing legs each moves slightly downwardly when said stabilizing legs are pivoted outwards from said main body into an open position.

* * * * *